No. 629,987. Patented Aug. 1, 1899.
R. A. DUTTON.
ATTACHMENT FOR AIR BRAKE HOSE COUPLINGS.
(Application filed Apr. 10, 1899.)

(No Model.)

Witnesses.
Howard D. Orr

Roy A. Dutton, Inventor,
By his Attorneys,

THE NORRIS PETERS CO., PHOTO-LITHO., WASHINGTON, D. C.

UNITED STATES PATENT OFFICE.

ROY ASHLEY DUTTON, OF TIPTON, IOWA.

ATTACHMENT FOR AIR-BRAKE HOSE-COUPLINGS.

SPECIFICATION forming part of Letters Patent No. 629,987, dated August 1, 1899.

Application filed April 10, 1899. Serial No. 712,448. (No model.)

*To all whom it may concern:*

Be it known that I, ROY ASHLEY DUTTON, a citizen of the United States, residing at Tipton, in the county of Cedar and State of Iowa, have invented a new and useful Attachment for Air-Brake Hose-Couplings, of which the following is a specification.

My invention relates to a dust cap or valve for air-brake hose-couplings, and particularly to an attachment adapted for application to hose-couplings of the ordinary construction, such application being possible either at the time of manufacture or subsequent to the use of the device; and the object in view is to provide a dust cap or valve which may be displaced to allow the interlocking of the coupling members without manual intervention or without special manipulation other than that necessary in bringing the coupling members into position for engagement.

Further objects and advantages of this invention will appear in the following description, and the novel features thereof will be particularly pointed out in the appended claims.

Figure 1:
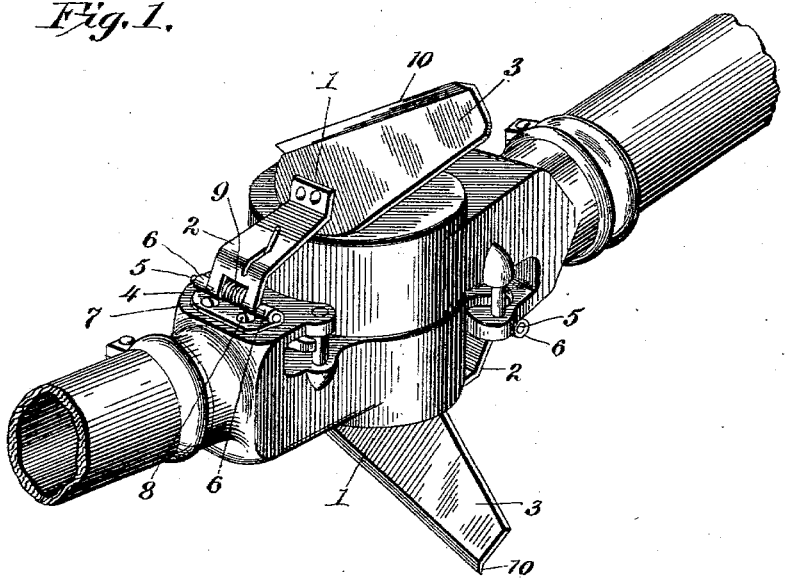
Figure 2:
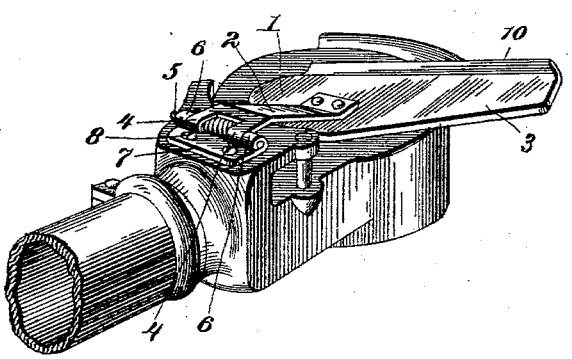

In the drawings, Figure 1 is a perspective view of a dust-shield constructed in accordance with my invention applied in the operative position to a coupling the members of which are arranged in their interlocked or operative positions. Fig. 2 is a view of the dust-shield in its operative position as seen when the coupling members are disconnected.

Similar reference characters indicate corresponding parts in both figures of the drawings.

In the drawings I have shown the dust-shield embodying my invention applied in the operative position to a coupling of which the members are of the ordinary construction in common use in connection with the Westinghouse and other air-brake systems, said shield consisting, essentially, of a valve or disk 1, carried by an arm 2, having a spring-hinge which serves to maintain the valve seated upon the usual rubber gasket, with which the coupling members are provided, to exclude dust, gravel, and other foreign objects or substances which are liable to obstruct the passage of a fluid, such as air or steam, in traversing the hose-sections to which said coupling members are attached. In order, however, that the unseating of th valves when two coupling members are to be connected may be accomplished with facility and without manual intervention, I provide each disk with a lateral extension 3, forming a trip-ear, which preferably is disposed obliquely with relation to the length of the coupling member and extends forwardly and laterally from the valve. This trip-ear extends beyond the contour of the coupling member, whereby when two coupling members are brought toward each other in position for engagement the trip-ear on the valve carried by one member is engaged by the other member and raised, and the valve is held in its displaced position until the coupling members are disconnected, whereupon it returns by the action of its spring-hinge to its operative or dust-excluding position.

In the construction illustrated the arm 2 is provided with hinge-eyes 4, mounted upon a hinge-pin 5, which is supported by lugs 6 on a fastening-plate 7, said fastening-plate being secured to the coupling member by means of screws 8 or the equivalents thereof. It should be understood, however, that if the coupling member is constructed originally for the application of the dust-shield it may be provided with integral lugs to support the hinge-pin, whereas to apply the device to a coupling member which is now in use it is necessary simply to drill openings for the reception of said securing-screws. Coiled upon the hinge-pin and suitably engaged with the arm 2 is a valve-closing spring 9. Also, in practice I prefer to provide the plate which forms the valve-disk and extension with a beveled or obliquely-upturned edge 10, which serves to facilitate the unseating of the valve and the sliding thereunder of that coupling member which is raising the same.

Various changes in the form, proportion, size, and minor details of construction within the scope of the appended claims may be resorted to without departing from the spirit or sacrificing any of the advantages of the invention.

Having described my invention, what I claim is—

1. The combination with a coupling member of a dust-shield comprising a movable spring-actuated cap provided with a trip-ear having a beveled edge adapted for engagement of the opposing member to raise the cap and permit engagement of the coupling members.

2. The combination with a coupling member, of a dust-shield comprising a movable spring-actuated cap provided with a trip-ear adapted for engagement by an opposing member to raise the cap and permit engagement of the coupling members.

3. A dust-shield for coupling members having a movable spring-actuated valve or cap, provided with a trip-ear extending beyond the contour of the coupling member, and provided with a beveled or cam-faced edge, substantially as specified.

4. A dust-shield for coupling members having a movable spring-actuated valve or cap, provided with a trip-ear extending beyond the contour of the coupling member, and provided with an obliquely-upturned forward edge, substantially as specified.

5. The combination with a coupling member and a dust-shield having a disk valve provided with an extension projecting beyond the contour of the coupling member and adapted for engagement of an opposing member, an arm for said disk valve and a spring-hinge for connecting said arm with the coupling member, substantially as specified.

6. A dust-excluding attachment for couplings, comprising a valve provided with a projecting trip-ear arranged in the path of a coupling member in bringing coöperating members into operative relation, a carrying-arm for said valve, a fastening-plate for attachment to the coupling member, and a spring-hinge connecting the carrying-arm with the fastening-plate, substantially as specified.

In testimony that I claim the foregoing as my own I have hereto affixed my signature in the presence of two witnesses.

ROY ASHLEY DUTTON.

Witnesses:
SHERMAN YATES,
H. R. RIPLEY.